United States Patent
Clark et al.

(10) Patent No.: US 7,931,889 B2
(45) Date of Patent: Apr. 26, 2011

(54) METHOD FOR PRODUCING HYDROGEN

(75) Inventors: Peter D. Clark, Calgary (CA); Justin A. Lamar, Olathe, KS (US); David K. Stevens, Prairie Village, KS (US)

(73) Assignee: Black & Veatch Corporation, Overland Park, KS (US)

( * ) Notice: Subject to any disclaimer, the term of this patent is extended or adjusted under 35 U.S.C. 154(b) by 111 days.

(21) Appl. No.: 12/387,319

(22) Filed: Apr. 30, 2009

(65) Prior Publication Data

US 2010/0123099 A1    May 20, 2010

Related U.S. Application Data

(60) Provisional application No. 61/198,099, filed on Nov. 3, 2008.

(51) Int. Cl.
*C01B 3/24* (2006.01)
*C01B 17/50* (2006.01)
*C01B 31/20* (2006.01)

(52) U.S. Cl. ........ 423/650; 423/511; 423/543; 423/220; 423/574.1

(58) Field of Classification Search .................. 423/650, 423/511, 543, 220, 574.1
See application file for complete search history.

(56) References Cited

U.S. PATENT DOCUMENTS

| | | | | |
|---|---|---|---|---|
| 6,395,197 | B1 * | 5/2002 | Detering et al. | ............... 252/373 |
| 7,157,167 | B1 * | 1/2007 | Muradov | ...................... 429/411 |

\* cited by examiner

*Primary Examiner* — Timothy C Vanoy
(74) *Attorney, Agent, or Firm* — Hovey Williams LLP

(57) ABSTRACT

A method for producing hydrogen from a light hydrocarbon gas with the hydrocarbon gas being converted to particulate carbon and hydrogen and thereafter quenched with liquid sulfur with the purified hydrogen being recovered as a product.

20 Claims, 3 Drawing Sheets

METHOD FOR PRODUCING HYDROGEN

RELATED CASES

This application is entitled to and hereby claims the benefit of the filing date of U.S. provisional application Ser. No. 61/198,099 entitled "Method for Producing Hydrogen" filed Nov. 3, 2008 by Peter D. Clark, Justin A. Lamar, and David K. Stevens.

FIELD OF THE INVENTION

The present invention relates to the production of hydrogen from a light hydrocarbon gas with the hydrocarbon gas being converted to particulate carbon and hydrogen and thereafter quenched with liquid sulfur with the purified hydrogen being recovered as a product.

BACKGROUND OF THE INVENTION

Recently there has been increased interest in the use of hydrogen as an automotive fuel and in many processes there is a requirement for hydrogen gas. These processes vary widely but particularly include refining operations. In most such operations, sour gas streams are also produced. These sour gas streams may be the result of other refining operations, such as desulfurization, crude oil distillation and the like. Further, natural gas streams containing acid gas components may be available to the refining operation. As a result of the removal of the acid gas components from such gases and the recovery of the acid gas components from other refinery streams, a considerable amount of sulfur is typically recovered by the use of Claus plants.

Claus plants are considered to be well known to the art and basically comprise the partial oxidation of an acid gas stream to oxidize any hydrocarbons present in the stream and to convert the stream to a stream which contains hydrogen sulfide and sulfur dioxide in a 2:1 ratio. The sulfur dioxide and the hydrogen sulfide are then reacted over well known catalysts in the Claus process in successive stages to produce sulfur and an exhaust gas stream, which after processing in a tail gas clean up unit as well known to the art, comprises primarily carbon dioxide and water. Such processes produce sulfur but in many instances the amount of sulfur available from such processes exceeds the demand for sulfur. Further there is a need for hydrogen in refining and other operations and for fuel.

Carbon black has been produced by a thermal carbon black process which consists of two furnaces which are used in alternate heating and production periods of about five minutes with each of the furnaces containing a network of heat resistant bricks. These are heated with natural gas and air. At a temperature of about 1400° C., the air is switched off and only natural gas is introduced for pyrolysis. Since this reaction is endothermic the temperature falls. At about 900° C. a new heating period is necessary. The products leaving the furnace are typically carbon black particles and nearly pure hydrogen gas. *Ullman's Encyclopedia of Industrial Chemistry* 5$^{th}$ Ed., Vol. A5, 1989.

It is also well known that acetylene can be used to produce acetylene black, which has slightly different properties than carbon black, but also results in the production of hydrogen, although less hydrogen is produced with acetylene than with saturated light gases, such as methane.

A further disclosure of thermal black processes is shown in Kirk-Othmer Encyclopedia of Chemical Technology, 4$^{th}$ Ed., Vol. 4, 1992, pp. 1053-1054.

Such processes are considered to be well known to those skilled in the art and require the use of substantial heat input to thermally decompose methane or other light hydrocarbon gases into carbon particles and hydrogen gas. The use of such processes results in the production of a hydrogen gas stream which contains particulate carbon. This carbon is difficultly separated from such streams and accordingly an improved process has been sought whereby the carbon is readily removed from such streams.

In view of the need for hydrogen and the excess capacity available for sulfur production, improved methods for the production of hydrogen utilizing the excess sulfur have been sought.

SUMMARY OF THE INVENTION

The present invention comprises a method for producing hydrogen from a light hydrocarbon gas, the method comprising: passing the light hydrocarbon gas to a light hydrocarbon gas thermal decomposition zone to produce particulate carbon and hydrogen; separating the carbon particles from the hydrogen by contacting the carbon particles and the hydrogen with liquid sulfur to produce a liquid sulfur and carbon particle suspension and hydrogen; and, passing a portion of the liquid sulfur and carbon particle suspension; and, an oxygen-containing gas to combustion to produce a desired temperature in the thermal decomposition zone and produce a stream containing sulfur dioxide and carbon dioxide.

The invention further comprises a method for producing hydrogen from a light hydrocarbon gas stream and an acid gas stream, the method consisting essentially of: passing the light hydrocarbon gas to a light hydrocarbon gas thermal decomposition zone to produce a particulate carbon and hydrogen; passing an acid gas steam to a Claus plant to produce a liquid sulfur stream and a carbon dioxide and water stream; passing the particulate carbon and hydrogen stream into contact with a portion of the liquid sulfur stream to produce a hydrogen stream and a liquid sulfur and carbon particulates suspension; and, combusting a portion of the liquid sulfur and carbon particles suspension with an oxygen-containing stream to produce heat for the thermal decomposition zone and a stream containing sulfur dioxide and carbon dioxide.

The invention also comprises a method for producing hydrogen, sulfur, a sulfur dioxide and carbon dioxide stream and a carbon dioxide and water stream from a light hydrocarbon gas stream and an acid gas stream, the method consisting essentially of: passing the light hydrocarbon gas to a light hydrocarbon gas thermal decomposition zone to produce particulate carbon and hydrogen; passing an acid gas stream to a Claus plant to produce a liquid sulfur stream and a carbon dioxide and water steam; contacting the particulate carbon and hydrogen with liquid sulfur to produce a hydrogen stream and a sulfur and particulate carbon suspension; and, combusting a portion of the sulfur and particulate carbon suspension in a combustion zone to produce heat and a sulfur dioxide and carbon dioxide stream.

DESCRIPTION OF PREFERRED EMBODIMENTS

In the description of the Figures, various pumps, valves, motors and the like required to achieve the described flows have not been shown since these articles of equipment are well known to those in the art and are omitted for conciseness. In the description of the Figures the same numbers will be used throughout to refer to the same or similar components in FIG. 1 and FIG. 2.

Figure 1:
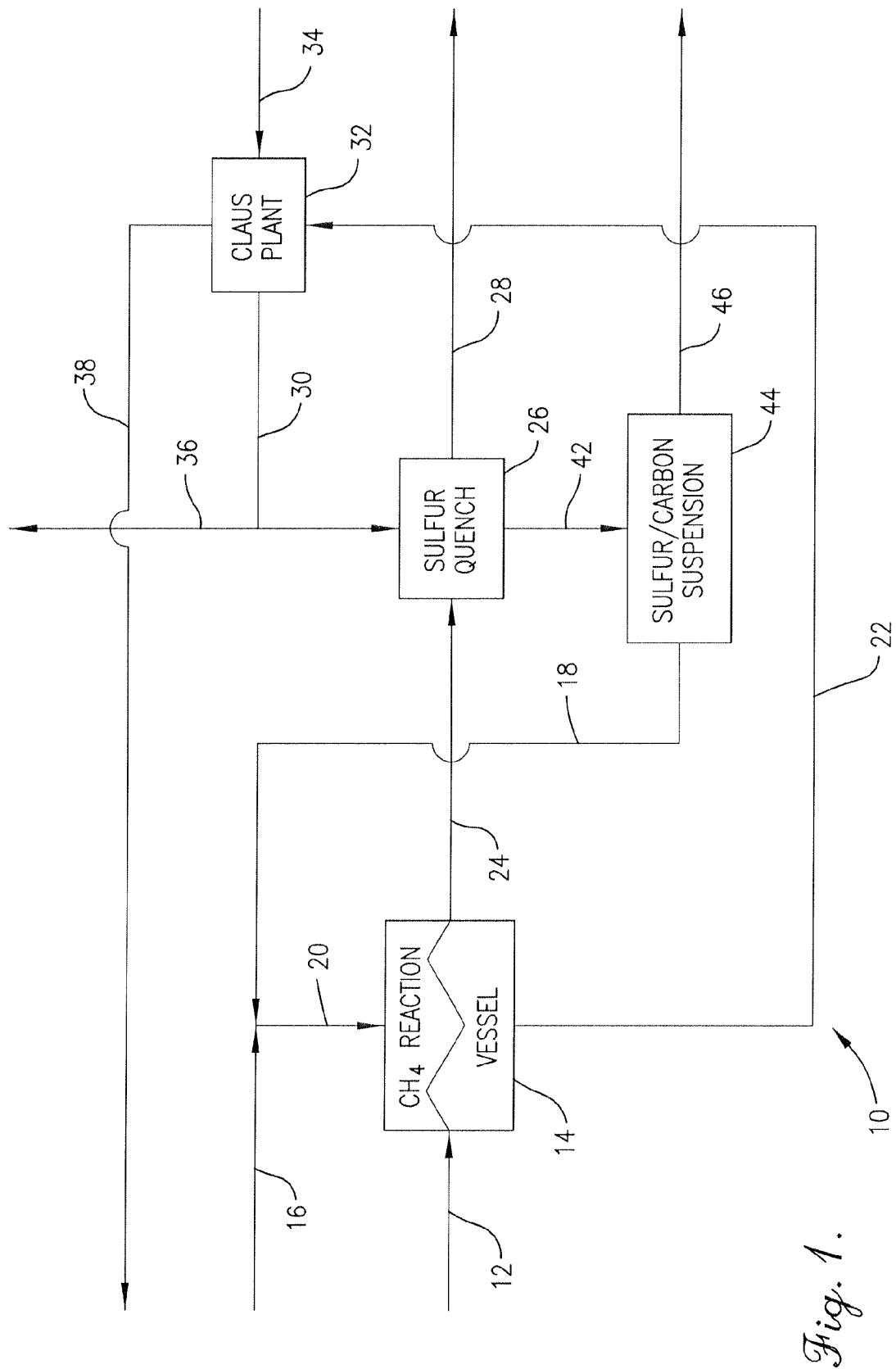
FIG. 1 discloses an embodiment of the present invention wherein a light hydrocarbon gas stream is passed to a thermal decomposition vessel with the exhaust stream from the vessel being passed to a sulfur quench to remove carbon particles with the sulfur being supplied by a Claus plant and a portion of the resulting sulfur/carbon suspension being used for a fuel to produce the desired temperature in the thermal decomposition vessel. The exhaust gas from the combustion of the sulfur/carbon suspension is passed to a Claus plant so that the products of the process are a sulfur stream, a hydrogen stream, a sulfur-carbon particulates suspension and a carbon dioxide and water stream.

In FIG. 1 a hydrogen production process 10 is shown wherein a methane or natural gas stream is charged through a line 12 to a light hydrocarbon gas disassociation vessel 14 which may optionally be a catalytic vessel. Vessel 14 is heated to a desired temperature (2300-2600° F.) by combustion of a liquid sulfur/carbon particulates suspension charged via line 18 with an oxygen-containing gas stream 16, which may be air, oxygen-enriched air, or pure oxygen, which is combined with the suspension in line 20 and, as shown, combusted in vessel 14 to produce the desired temperature to thermally decompose the light hydrocarbon gas and produce a carbon dioxide/sulfur dioxide stream 22. The light hydrocarbon gas is desirably natural gas and may contain hydrocarbon gases up to as high as propane. Desirably heavier hydrocarbon gases have been removed from this stream prior to passing it to vessel 14. It will be appreciated that the methane stream in line 12 may have been treated for the removal of acid gases and the like which if removed, may be charged to a Clause plant 32.

The mixture of hydrogen and carbon particles is passed from vessel 14 through a line 24 to a sulfur quench vessel 26 wherein the stream is passed in intimate contact with a liquid sulfur stream to remove carbon particles from the hydrogen stream. The recovered hydrogen stream is then passed through a line 28 optionally with additional purification (not shown), as a product stream. The sulfur/carbon particle suspension is passed via a line 42 to a zone 44 from which it may be exported through a line 46 as a product or in which it may be solidified and marketed as a solid product. In either event, this material is desirable as a fuel and is particularly desirable for use as a fuel in sulfuric acid plants.

The Claus plant 32 receives an acid gas feed stream through a line 34, which may contain hydrogen sulfide, sulfur dioxide, light hydrocarbons and the like and optionally a carbon dioxide/sulfur dioxide stream through line 22. In the Claus process, these materials are treated to produce sulfur and a gaseous stream 38 comprising carbon dioxide and water, which may be treated for venting to the atmosphere. The Claus plant produces sulfur, which is recovered through a line 30 and passed via line 30 to sulfur quench 26. A sulfur product stream is also produced and recovered through a line 36. By this process, a hydrogen stream and a sulfur/carbon particle suspension stream is produced along with a carbon dioxide and water stream and a sulfur product stream from light hydrocarbon gas and acid gases. This embodiment has effectively used a substantial quantity of the sulfur produced to produce another more valuable stream, i.e. the hydrogen stream. Further the sulfur recovered with the carbon suspension is a desirable fuel product and is readily marketed.

The various types of and operation of the thermal decomposition vessel are considered to be well known, as is the operation of the Claus plant. The sulfur quench can be by any suitable contacting method which effectively contacts the liquid sulfur with the gaseous stream. Further the sulfur/carbon particle suspension may be marketed, as indicated, as a liquid or it may be solidified and marketed as a solid. Methods for converting such liquid streams to solids for marketing are well known to those skilled in the art and need not be discussed further.

Figure 2:
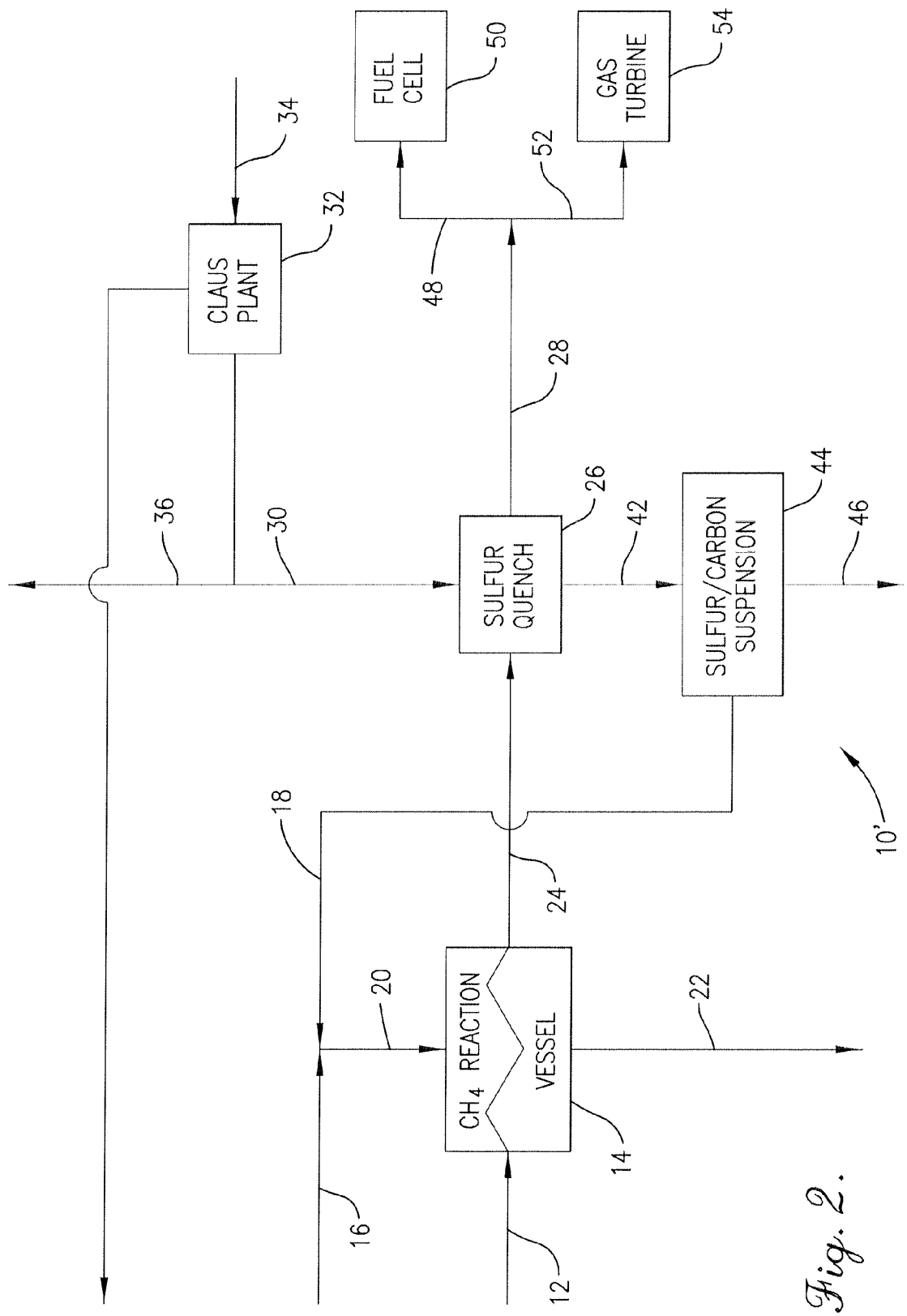
FIG. 2 shows a similar process wherein the product streams are a sulfur dioxide/carbon dioxide stream which is passed to injection into a subterranean formation or the like, a water/carbon dioxide stream and a hydrogen stream which is converted into energy.

In FIG. 2 a similar process 10' is shown, but the sulfur dioxide/carbon dioxide stream recovered through line 22 is passed to disposal in a subterranean formation or the like in lieu of passing it back to Claus plant 32. The stream charged through line 12 is a natural gas or pure methane stream and the operation of the decomposition vessel 14 is substantially the same as discussed above. The hydrogen stream produced through line 28 is passed via a line 48 to a fuel cell 50, gas turbine or via a line 52 to any other suitable device, such as a turbine 54, for converting the hydrogen into energy by the generation of steam, electricity or the like. This process produces, from an acid gas and a natural gas, an injection stream of sulfur dioxide and carbon dioxide, a product stream of sulfur, a sulfur/carbon particle suspension, energy and a stream comprising carbon dioxide and water.

Many variations of the flow schemes shown above are possible to utilize the thermal decomposition reactor to produce the hydrogen and carbon particles with the removal of the carbon particles from the hydrogen by the use of a sulfur quench using sulfur produced by a Claus plant or other source of sulfur, which may utilize an acid gas waste stream to produce the sulfur. Both the sulfur and sulfur/carbon particle suspension are marketable as products as is the hydrogen stream with the sulfur dioxide and carbon dioxide being useful for injection into a subterranean formation for recovery of hydrocarbons.

Figure 3:
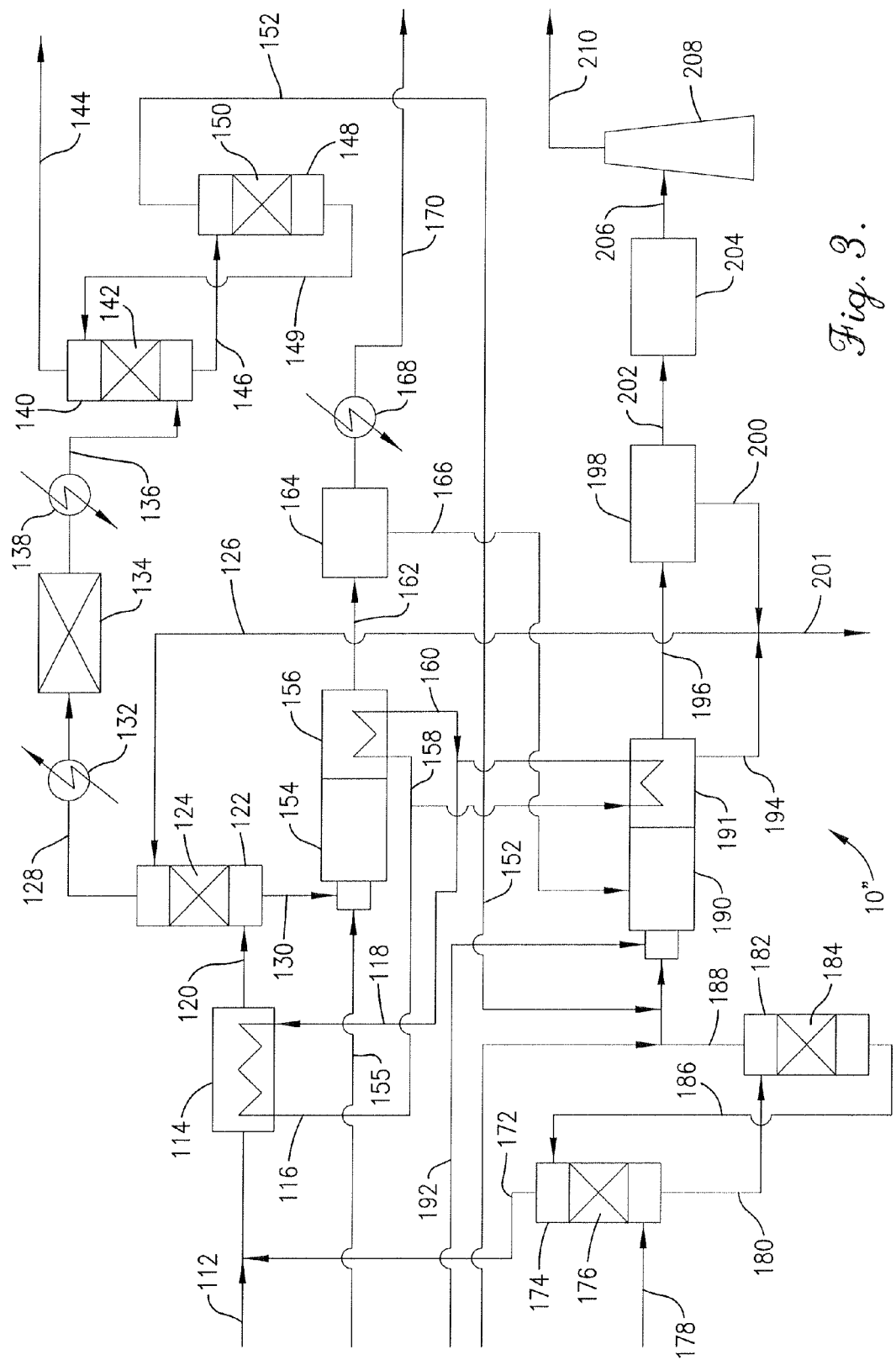
FIG. 3 shows an alternate embodiment of the present invention.

In FIG. 3 a process 10" is shown wherein an acid gas stream and a light hydrocarbon gas steam are converted into a hydrogen stream, a sulfur dioxide/carbon dioxide stream, a sulfur products stream and an exhaust carbon dioxide and water stream. In this process, a light hydrocarbon gas is charged through a line 112 to a thermal decomposition zone 114 which is heated to produce a desired temperature, which typically is from about 2300 to about 2600° F., to thermally disassociate the light hydrocarbon gas into a stream recovered through a line 120, which includes carbon particulates and hydrogen. This stream is passed into a sulfur scrubber 122, which includes a contact zone 124 wherein the gaseous stream containing the carbon particulates is passed upwardly through a downcoming stream of molten sulfur supplied to vessel 122 through a line 126.

A stream of hydrogen is recovered via a line 128 and passed through a heater 132 prior to passing to a hydrogenation vessel 134. Hydrogenation vessel 134 may include a suitable hydrogenation catalyst. Hydrogenation vessel 134 is used to hydrogenate any sulfur compounds which may remain in the hydrogen stream is line 128. The recovered stream from vessel 134 is passed through a line 136, which includes a heat exchanger 138, to an amine scrubber which comprises a first vessel 140 having a contact zone 142 wherein the hydrogen stream flows upwardly countercurrently to a downcoming aqueous lean amine stream 149 (regenerated amine) wherein the hydrogen sulfide is absorbed with the hydrogen stream being purified and discharged through a line 144.

The spent amine is recovered through a line 146 and passed to the upper portion of an amine regenerator 148 which includes a contact zone 150 where it flows downwardly, countercurrently to a stripping gas stream (not shown) to strip the hydrogen sulfide from the spent amine and produce a regenerated amine which is passed back to the top of vessel 140 as shown in line 149. The acid gas steam in line 152 is desirably passed to the feedstream into a Claus process having a Claus combustor 190.

The stream of sulfur and carbon particulates recovered through a line 130 is passed to oxidation in a combustor 154, which includes a heat recovery section 156. An oxygen stream containing oxygen, oxygen enriched air or air is charged through line 155 to combustor 154 to produce sulfur dioxide and carbon dioxide which are passed through a line 162 to a heat recovery section 164 from which sulfur dioxide may be recovered and passed via a line 166 to Claus reactor 190 as desired. The amount of sulfur dioxide removed and returned to the Claus reactor 190, is determined based upon the amount of sulfur dioxide necessary to produce the desired ratio of hydrogen sulfide to sulfur dioxide in the Claus process. The sulfur dioxide is used as desired to adjust the ratio of hydrogen sulfide to sulfur dioxide in the Claus process. The remaining constituents of the combustion stream in line 162 are then passed through a line 170, which includes a heater 168 to cool the stream to a desired temperature with the stream of sulfur dioxide and carbon dioxide then being passed via a line 170 to injection into a subterranean formation or other disposal.

An acid gas stream 178 may be passed to a first vessel 174 of an amine scrubbing system, which includes a contacting zone 176 to produce a desulfurized light hydrocarbon gas which is passed by a line 172 to combination with the natural gas stream or light hydrocarbon gas stream passed into the disassociation vessel 114 via line 112. The acid gas constituents removed are removed by an amine solution which is passed through a line 186 to an upper portion of vessel 174 and contact the rising gas stream to remove the acid gas components from the stream for recovery through a line 180, which contains spent amine solution. This stream is passed to an upper portion of an amine regeneration vessel 182, including a reaction zone 184. The regenerated amine is recovered through a line 186 and returned to the upper portion of vessel 174. The acid gas constituents removed from vessel 182 along with a stripping gas, constitute an acid gas which may be used as a feedstream 188 to Claus reactor 190. Further a second acid gas stream may be charged to the process through a line 152 as an additional acid gas feedstream to Claus reactor 190.

The acid gas streams fed to Claus reactor 190 are partially combusted with an oxygen-containing stream supplied via a line 192, which may be air, oxygen, enriched air or oxygen, to produce a gaseous mixture having a ratio of hydrogen sulfide to sulfur dioxide of 2:1. These gases are at a relatively high temperature (typically, equal to or greater than 1500° F.) and are passed to a heat recovery zone 191 at a temperature from about 2200 to about 2800° F. from which heat values are recovered. The gaseous mixture is passed through line 196 to catalytic sulfur stages schematically shown at 198. Molten sulfur is typically produced from heat recovery zone 191, as shown through a line 194, with additional sulfur being recovered from the catalytic Claus stages 198 as shown through a line 200. These streams are combined to produce a product stream of sulfur in line 201. A portion of the sulfur is passed through line 126 to sulfur quench in vessel 122.

The remaining components of the gaseous stream pass to the catalytic Claus stages and then via a line 202 to a conventional Claus tail gas treating process and then through line 206 to a Claus tail gas clean-up zone 204 an then to a stack 208 and to the atmosphere via a discharge as shown by line 210. The heat produced in heat recovery 191 is shown as recovered by lines 118 and 160 and show the transfer of heat from heat recovery sections 156 and 191 to vessel 114 with the cooled stream from vessel 114 being recovered via lines 116 and 158. The heat is thus transferred from heat recovery sections 191 and 156 to supply the heat required in thermal disassociation vessel 114.

This process results in the production of a hydrogen stream and a sulfur dioxide and carbon dioxide stream from an acid gas stream and a light hydrocarbon gas stream. The light hydrocarbon gas stream may be natural gas ad it may contain acid gases which may be separated as shown to produce desulfurized gas for charging to thermal disassociation vessel 114 by conventional amine scrubbing processes. In combination, the process produces a clean hydrogen stream, which may be at an elevated pressure if desired, a sulfur dioxide and carbon dioxide stream and a carbon dioxide and water stream with a product sulfur stream. The sulfur dioxide and carbon dioxide stream can be used as an injection stream for secondary or tertiary recovery of hydrocarbons or for other suitable uses.

In all of its embodiments, this process has used sulfur constituents for the production of energy and for the separation of carbon particles from hydrogen gas to produce a hydrogen gas stream by the use of sulfur streams produced from sulfur which may be in excess of the demand for sulfur. In any event, even if the demand for sulfur is adequate to require the production of all of the sulfur available, the use of the sulfur on site as an existing process stream results in economies of operation since a locally produced stream is used as a reagent and does not require importation into the process.

In summary, the present invention has been shown to be effective to produce hydrogen by heretofore unknown processes at units wherein Claus plants are present so that the hydrogen may be made available for other process requirements thereby avoiding the cost and inconvenience of importation of hydrogen into the plant.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for producing hydrogen from a light hydrocarbon gas, the method comprising:
   a) passing the light hydrocarbon gas to a light hydrocarbon gas thermal decomposition zone to produce particulate carbon and hydrogen;
   b) separating the carbon particles from the hydrogen by contacting the carbon particles and the hydrogen with liquid sulfur to produce a liquid sulfur and carbon particle suspension and hydrogen; and,
   c) passing a portion of the liquid sulfur and carbon particle suspension and an oxygen-containing gas to combustion to produce a desired temperature in the thermal decomposition zone and produce a stream containing sulfur dioxide and carbon dioxide.

2. The method of claim 1 wherein the temperature in the thermal decomposition zone is from about 2300 to about 2600° F.

3. The method of claim 1 wherein the light hydrocarbon gas contains from 1 to about 3 carbon atoms per molecule.

4. The method of claim 1 wherein the light hydrocarbon gas is a natural gas.

5. The method of claim 1 wherein a light hydrocarbon gas containing acid gas is passed to an amine scrubbing process to produce an inlet acid gas stream to the Claus plant and a light hydrocarbon gas inlet stream to the light hydrocarbon gas decomposition zone.

6. The method of claim 1 wherein the liquid sulfur is produced in a Claus plant.

7. The method of claim 1 wherein a portion of the stream containing sulfur dioxide and carbon dioxide is passed to the Claus plant.

8. The method of claim 1 wherein a sour gas stream containing hydrogen sulfide is charged to the Claus plant and wherein the Claus plant produces a product sulfur stream and the liquid sulfur required to produce the liquid sulfur and carbon particles suspension.

9. A method for producing hydrogen from a light hydrocarbon gas stream and an acid gas stream, the method consisting essentially of:
   a) passing the light hydrocarbon gas to a light hydrocarbon thermal decomposition zone to produce a particulate carbon and hydrogen;
   b) passing an acid gas stream to a Claus plant to produce a liquid sulfur stream and a carbon dioxide and water stream;
   c) passing the particulate carbon and hydrogen stream into contact with a portion of the liquid sulfur stream to produce a hydrogen stream into contact with a portion of the liquid sulfur stream to produce a hydrogen stream and a liquid sulfur and carbon particulates suspension; and
   d) combusting a portion of the liquid sulfur and carbon particles suspension with an oxygen-containing stream to produce heat for the thermal decomposition zone and a stream containing sulfur dioxide and carbon dioxide.

10. The method of claim 9 wherein the light hydrocarbon gas comprises natural gas.

11. The method of claim 9 wherein the acid gas stream comprises hydrogen sulfide.

12. The method of claim 9 wherein the acid gas stream comprises hydrogen sulfide.

13. The method of claim 9 wherein the temperature in the thermal decomposition zone is from about 2300 to 2600° F.

14. A method for producing hydrogen, sulfur, a sulfur dioxide and carbon dioxide stream and a carbon dioxide and water stream from a light hydrocarbon gas stream and an acid gas stream, the method comprising:
   a) passing the light hydrocarbon gas to a light hydrocarbon gas thermal decomposition zone to produce particulate carbon and hydrogen;
   b) passing an acid gas stream to a Claus plant to produce a liquid sulfur stream and a carbon dioxide and water stream;
   c) contacting the particulate carbon and hydrogen with liquid sulfur to produce a hydrogen stream and a sulfur and particulate carbon suspension; and
   d) combusting the sulfur and particulate carbon suspension in a combustion zone to produce heat and a sulfur dioxide and carbon dioxide stream.

15. The method of claim 14 wherein the hydrogen stream is contacted with a hydrogenation catalyst and passed to an amine scrubbing process to remove hydrogen sulfide from the hydrogen stream and produce a second acid gas stream.

16. The method of claim 14 wherein a portion of the sulfur dioxide is separated from the sulfur dioxide and carbon dioxide stream and passed to the Claus process.

17. The method of claim 14 wherein the heat from the combustion of the sulfur and particulate carbon suspension is transferred to the light hydrocarbon gas decomposition zone.

18. The improvement of claim 14 wherein heat from a Claus process combustion zone is transferred to the light hydrocarbon gas decomposition zone.

19. The method of claim 15 wherein the second acid gas stream is charged to the Claus plant.

20. The method of claim 14 wherein a second light hydrocarbon gas stream is charged to the light hydrocarbon gas decomposition zone.

* * * * *